United States Patent [19]

Marinaccio et al.

[11] Patent Number: 4,915,839

[45] Date of Patent: Apr. 10, 1990

[54] PROCESS FOR SURFACE MODIFYING A MICROPOROUS MEMBRANE

[75] Inventors: Paul J. Marinaccio, Monroe; Rodney A. Knight, New Milford; Joseph V. Fiore, Fairfield, all of Conn.

[73] Assignee: Cuno, Incorporated, Meriden, Conn.

[21] Appl. No.: 292,324

[22] Filed: Dec. 30, 1988

Related U.S. Application Data

[63] Continuation of Ser. No. 589,895, Mar. 15, 1984.

[51] Int. Cl.$^4$ .............................................. B01D 13/00
[52] U.S. Cl. ........................... 210/500.23; 210/500.38; 210/502; 210/504; 210/505; 210/502.1
[58] Field of Search ........... 210/323.2, 500.23, 500.38, 210/502, 504, 505, 508

[56] References Cited

U.S. PATENT DOCUMENTS

| | | | |
|---|---|---|---|
| 3,246,767 | 4/1966 | Pall et al. | 210/505 |
| 4,212,744 | 7/1980 | Oota | 210/321.64 |
| 4,431,545 | 2/1984 | Pall et al. | 210/500.38 X |

Primary Examiner—Frank Spear
Attorney, Agent, or Firm—Weingram & Zall

[57] ABSTRACT

A process for surface modifying skinless hydrophilic microporous membrane having an internal microstructure throughout said membrane and a surface modifying amount of surface modifying agent bound thereto without substantial pore reduction of pore blockage involves the steps of providing a dope solution of a membrane forming polymer in a solvent system comprising a mixture of at least one solvent and one non-solvent for the polymer, and a membrane surface modifying agent, and combining said dope solution with sufficient additional non-solvent for the polymer to precipitate said membrane from said dope solution.

19 Claims, 1 Drawing Sheet

PROCESS FOR SURFACE MODIFYING A MICROPOROUS MEMBRANE

This is a continuation of co-pending application Ser. No. 589,895 filed on Mar. 15, 1984.

RELATED APPLICATIONS

This application is related to copending U.S. application Ser. No. 314,307, filed Oct. 23, 1981, now U.S. Pat. No. 4,473,474, which is a continuation-in-part of U.S. application Ser. No. 201,366, filed Oct. 27, 1980 (now abandoned), both entitled "Charge Modified Microporous Membrane, Process for Charge Modifying Said Membrane and Process for Filtration of Fluid", to Ostreicher.

This application is also related to copending U.S. application Ser. No. 268,543, filed May 29, 1981, now U.S. Pat. No. 4,473,475, entitled "Charge Modified Microporous Membrane, Process for Charge Modifying Said Membrane, and Process for Filtration of Fluid", to Barnes, Jr. et al.

This application is further related to copending U.S. application Ser. No. 566,764, filed Dec. 29, 1983, now U.S. Pat. No. 4,604,208, entitled "Anionic Charge Modified Microporous Membrane, Process for Charge Modifying Said Microporous Membrane and Filtration of Fluid", to Chu et al.

BACKGROUND OF THE INVENTION

1. Field of the Invention

This invention relates to microporous membranes, and more particularly to surface modified microporous membranes suitable for the filtration of aqueous fluids, such as biological liquids.

2. Prior Art

Microporous membranes are well known in the art. For example, U.S. Pat. No. 3,876,738 to Marinaccio et al. (1975) describes a process for preparing a microporous membrane, for example, by quenching a solution of a film forming polymer in a non-solvent system for the polymer. European patent application No. 0 005 536 to Pall (1979) describes a similar process.

Commercially available microporous membranes, for example, made of nylon, are available from Pall Corporation, Glen Cove, N. Y. under the trademark "ULTIPOR $N_{66}$". Such membranes are advertised as useful for the sterile filtration of pharmaceuticals, e.g. removal of microorganisms.

Various studies in recent years, in particular Wallhausser, Journal of Parenteral Drug Association, Jun., 1979, Vol. 33, #3, pp. 156-170, and Howard et al, Journal of the Parenteral Drug Association, Mar.-Apr., 1980, Volume 34, #2, pp. 94-102, have reported the phenomena of bacterial breakthrough in filtration media, in spite of the fact that the media had a low micrometer rating. For example, commercially available membrane filters for bacterial removal are typically rated as having an effective micrometer rating for the microreticulate membranes structure of 0.2 micrometers or less, yet such membrane typically have only a 0.357 effective micrometer rating for spherical contaminant particles, even when rated as absolute for *Ps. diminuta*, the conventional test for bacterial retention. This problem of passage of a few microorganisms under certain conditions has been rendered more severe as the medical uses of filter membranes has increased.

One method of addressing this problem is to prepare a tighter filter having a sufficiently small effective pore dimension to capture microorganisms, etc., by mechanical sieving. Such microporous membranes of 0.1 micrometer rating or less may be readily prepared but flow rates at conventional pressure drops are prohibitively low. Increasing the pressure drop to provide the desired flow rate is not generally feasible because pressure drop is an inverse function of the fourth power of pore diameter.

It has long been recognized that adsorptive effects can enhance the capture of particulate contaminants. For example, Wenk, "Electrokinetic and Chemical Aspects of Water Filtration", Filtration and Separation, May/Jun. 1974, indicates that surfactants, pH, and ionic strength may be used in various ways to improve the efficiency of a filter by modifying the charge characteristics of either the suspension, filter or both.

It has also been suggested that adsorptive sequestration (particle capture within pore channels), may sometimes be more important in sterile filtration than bubble point characterization of internal geometry (representing the "largest pore"). See, e.g., Tanny et al, Journal of the Parenteral Drug Association, Nov.-Dec. 1978, Vol. 21, #6, pp. 258-267 and Jan.-Feb., 1979, Vol. 33, #1, pp. 40-51 and Lukaszewicz et al, Id., Jul.-Aug., 1979, Vol. 33, #4, pp. 187-194.

Pall et al, Colloids and Surfaces 1 (1980), pp. 235-256, indicates that if the zeta potential of the pore walls of a membrane, e.g. nylon 66, and of the particles are both low, or if they are oppositely charged, the particle will tend to adhere to the pore walls, and the result will be removal of particles smaller than the pores of the filter. Pall et al suggest the use of membranes of substantially smaller pore size to increase the probability of obtaining microbial sterility in filtering fluids.

Zierdt, Applied and Environmental Microbiology, Dec. 1979, pp. 1166-1172, found a strong adherence by bacteria, yeast, erythrocytes, leukocytes, platelets, spores and polystyrene spheres to membrane materials during filtration through membranes with pore-size diameters much larger than the particles themselves. Zierdt found that cellulose membranes adsorbed more bacteria, blood cells and other particles than did polycarbonate filters. Of lesser adsorptive capacity were vinyl acetate, nylon, acrylic and Teflon membranes. Zierdt additionally found that solvent cast membrane filter materials, e.g. nylon, had strong surface charges, whereas ordinary fibrous cellulose materials which are not solvent cast do not.

Attempts to increase the short life of filter media due to pore blockage and enhance flow rates through filter media having small pores have been made by charge modifying the media by various means to enhance capture potential of the filter. For example, U.S. Pat. Nos. 4,007,113 and 4,007,114 to Ostreicher, describe the use of a melamine formaldehyde cationic colloid to charge modify fibrous and particulate filter elements; U.S. Pat. No. 4,305,782, to Ostreicher et al describes the use of an inorganic cationic colloidal silica to charge modify such elements; and U.S. Ser. No. 164,797, filed Jun. 30, 1980, to Ostreicher et al, describes the use of a polyamidopolyamine epichlorhydrin cationic resin to charge modify such filter elements. None of these references teaches or suggests charge modifying a synthetic organic polymeric microporous membrane, nor do any of the filtration media described therein, e.g. fiber and/or particulate, provide the advantages of such a membrane.

Similarly, U.S. Pat. Nos. 3,242,073 (1966) and 3,352,424 (1967) to Guebert et al, describe removal of micro-organisms from fluids by passage through a filter medium of conventional anionic type filter aid, e.g. diatomaceous earth, paper filter pulp, fullers earth, charcoal, etc., having an adsorbed cationic, organic, polyelectrolyte coating. The coated filter aid media is said to possess numerous cationic sites which are freely available to attract and hold particles bearing a negative surface charge.

U.S. Pat. No. 4,178,438 to Hasset et al (1979) describes a process for the purification of industrial effluent using cationically modified cellulose containing material, e.g., bleached or unbleached pine sulphite cellulose, kraft sulphate cellulose, paper, cardboard products, textiles fibers made of cotton, rayon staple, jute, woodfibers, etc. The cationic substituent is bonded to the cellulose via a grouping —O—$CH_2$—N—, where the nitrogen belongs to an amide group of the cationic part and the oxygen to the cellulose part.

There are numerous references which describe the treatment of porous membranes for various objects. U.S. Pat. No. 3,556,305 to Shorr (1971) describes a tripartite membrane for use in reverse osmosis comprising an anisotropic porous substrate, an ultra-thin adhesive layer over the porous substrate, and a thin diffusive membrane formed over the adhesive layer and bound to the substrate by the adhesive layer. Such anisotropic porous membranes are distinguished from isotropic, homogeneous membrane structures used for microfiltration whose flow and retention properties are independent of flow direction and which do not function properly when utilized in the invention of Shorr.

U.S. Pat. No. 3,556,992 to Massuco (1971) describes another anisotropic ultra-filtration membrane having thereon an adhering coating of irreversibly compressed gel.

U.S. Pat. No. 3,808,305 to Gregor (1974) describes a charged membrane of macroscopic homogeneity prepared by providing a solution containing a matrix polymer, polyelectrolytes (for charge) and a crosslinking agent. The solvent is evaporated from a cast film which is then chemically cross-linked. The membranes are used for ultrafiltration.

U.S. Pat. Nos. 3,944,485 (1976) and 4,045,352 (1977) to Rembaum et al describe ion exchange hollow fibers produced by introducing into the wall of the preformed fiber, polymerizable liquid monomers which are then polymerized to form solid, insoluble, ion exchange resin particles embedded within the wall of the fiber. The treated fibers are useful as membranes in water treatment, dialysis and generally to separate ionic solutions. See also U.S. Pat. No. 4,014,798 to Rembaum (1977).

U.S. Pat. No. 4,005,012 to Wrasidlo (1977) describes a process for producing a semi-permeable anisotropic membrane useful in reverse osmosis processes. The membranes are prepared by forming a polymeric ultra-thin film, possessing semi-permeable properties by contacting an amine modified polyepihalohydrin with a polyfunctional agent and depositing this film on the external surface of a microporous substrate. Preferred semi-permeable membranes are polysulfone, polystyrene, cellulose butyrate, cellulose nitrate and cellulose acetate.

U.S. Pat. No. 4,125,462 to Latty (1978) describes a coated semi-permeable reverse osmosis membrane having an external layer or coating of a cationic polyelectrolyte preferably poly(vinylimidazoline) in the bi-sulfate form.

U.S. Pat. No. 4,214,020 to Ward et al (1980) describes a novel method of coating the exteriors of a bundle of hollow-fiber semi-permeable membranes for use in fluid separations. Typical polymers coated are polysulfones, polystyrenes, polycarbonates, cellulosic polymers, polyamides and polyimides. Numerous depositable materials are listed, see col. 10, lines 55 - col. 12, for example, poly(epichlorhydrin) or polyamides.

U.S. Pat. No. 4,239,714 to Sparks et al (1980) describes a method of modifying the pore size distribution of a separation media to provide it with a sharp upper cut-off of a preselected molecular size. This is accomplished by effectively blocking the entrances to all of the pores larger than a preselected desired cut-off size, but leaving unchanged the smaller pores. The separation media may be in the form of polymeric membranes, e.g. cellulose acetate, cellulose nitrate, polycarbonates, polyolefins, polyacrylics, and polysulfones. The pores are filled with a volatile liquid which is evaporated to form voids at the pore entrances and a concentrated solution of a crosslinkable or polymerizable pore blocking agent, such as protein, enzyme, or polymeric materials is then applied to the surface of the membrane.

U.S. Pat. No. 4,250,029 to Kiser et al (1981) describes coated membranes having two or more external coatings of polyelectrolytes with at least one oppositely charged adjacent pair separated by a layer of material which is substantially charge neutralized. Kiser et al is primarily directed to the use of charged membranes to repel ions and thereby prevent passage through the membrane pores. The coated membranes are described as ordinary semi-permeable membranes used for ultrafiltration, reverse osmosis, electrodialysis or other filtration processes. A microscopic observation of the coated membranes shows microscopic hills and valleys of polyelectrolyte coating formed on the original external smooth skin of the membrane. The membranes are particularly useful for deionizing aqueous solutions. Preferred membranes are organic polymeric membranes used for ultrafiltration and reverse osmosis processes, e.g., polyimide, polysulfone, aliphatic and aromatic nylons, polyamides, etc. Preferred membranes are anisotropic hollow fiber membranes having an apparent pore diameter of from about 21 to about 480 angstroms.

Charge modified microporous filter membranes are disclosed in U.S. Ser. No. 358,822 of Ostreicher, filed May 9, 1973, now abandoned (corresponding to Japanese Pat. No. 923,649 and French Pat. No. 74 15733). As disclosed therein, an isotropic cellulose mixed ester membrane, was treated with a cationic colloidal melamine-formaldehyde resin to provide charge functionality. The membrane achieved only marginal charge modification. Additionally, the membrane was discolored and embrittled by the treatment, extractables exceeded desirable limits for certain critical applications, and the membrane was not thermally sanitizable or sterilizable. Ostreicher also suggests such treatment for the nylon membranes prepared by the methods described in U.S. Pat. No. 3,783,894 to Lovell (1957) and U.S. Pat. No. 3,408,315 to Paine (1968). It has been demonstrated that nylon microporous membranes treated according to said Ostreicher reference would also demonstrate marginal charge modification, high extractables and/or inability to be thermally sanitizable or sterilizable.

The aforesaid Ostreicher U.S. Ser. No. 314,307 (published as PCT 0050804 on May 5, 1982) generally describes a novel cationic charge modified microporous membrane comprising a hydrophilic organic polymeric microporous membrane and a charge modifying amount of a primary cationic charge modifying agent bonded to substantially all of the internal microstructure of the membrane. The primary charge modifying agent is a water-soluble organic polymer having a molecular weight greater than about 1,000 wherein each monomer thereof has at least one epoxide group capable of bonding to the surface of the membrane and at least one tertiary amine or quaternary ammonium group. Preferably, a portion of the epoxy groups on the organic polymer are bonded to a secondary charge modifying agent selected from the group consisting of:

(i) aliphatic amines having at least one primary amino or at least two secondary amino groups; and (ii) aliphatic amines having at least one secondary amino and a carboxyl or hydroxyl substituent.

The membrane is made by a process for cationically charge modifying a hydrophilic organic polymeric microporous membrane by applying to the membrane the aforesaid charge modifying agents, preferably by contacting the membrane with aqueous solutions of the charge modifying agents. The preferred microporous membrane is nylon, the preferred primary and secondary charge modifying agents are, respectively, polyamido-polyamine epichlorohydrin and tetraethylene pentamine. The charge modified microporous membrane may be used for the filtration of fluids, particularly parenteral or biological liquids. The membrane has low extractables and is sanitizable or sterilizable.

The aforesaid Chu et al Ser. No. 566,764 generally describes a novel anionic charge modified microporous membrane comprising a hydrophilic organic polymeric microporous membrane and a charge modifying amount of anionic charge modifying agent bonded to substantially all of the membrane microstructure. The anionic charge modifying agent is preferably a water-soluble polymer having anionic functional groups, e.g. carboxyl, phosphonous, phosphonic and sulfonic groups. The charged membrane is made by a process of applying the anionic charge modifying agent to the membrane, preferably by contacting the membrane with aqueous solutions of the charge modifying agent.

The just described applications describe a comparatively complex treatment of a preformed membrane requiring treatment, rinse and drying steps which involve complicated equipment and expensive capital investment.

OBJECTS AND SUMMARY OF THE INVENTION

It is an object of this invention to provide a process for surface modifying a hydrophilic organic polymeric microporous membrane so as to provide a novel surface modified microporous membrane, particularly suitable for the microfiltration of biological or parenteral liquids.

It is another object of this invention to provide an isotropic, surface modified microporous membrane which preferably has low extractables suitable for the microfiltration of biological or parenteral liquids.

It is yet another object of this invention to prepare a sanitizable or sterilizable microporous membrane for the efficient removal of bacteria, viruses and pyrogen from contaminated liquids.

A still further object of this invention is to provide a process for enhancing the filtration, adsorptive and/or capacity of microporous membranes without affecting the internal microreticulate structure.

It is still a further object of this invention to provide a process for producing a microporous membrane capable of capturing anionic or cationic particulate contaminant of a size smaller than the effective pore size of the membrane.

These and other objects of this invention are attained by a process for surface modifying a hydrophilic organic polymeric microporous membrane by forming the membrane from a composition containing surface modifying agents. The preferred microporous membrane is nylon, the preferred surface modifying agents are polyamido-polyamine epichlorohydrin, ethylene diamine tetraacetic acid, carbon, silica and other chromatographic additives, poly (styrene sulfonic acid) and poly (acrylic acid).

The surface modified microporous membrane produced by this invention may be used for the microfiltration of fluids, particularly parenteral or biological liquids.

DETAILED DESCRIPTION OF THE INVENTION

The process of this invention produces a hydrophilic surface modified organic polymeric microporous membrane.

By the use of the term "microporous membrane" as used herein, it is meant a skinless ("symmetric"), isotropic or anisotropic porous membrane having a pore size of at least 0.05 microns or larger, or an initial bubble point (IBP), as that term is used herein, in water of less than 120 psi. A maximum pore size useful for this invention is about 1.2 micron or an IBP of greater than about 10 psi. By "isotropic" it is meant that the pore structure is substantially the same throughout the cross-sectional structure of the membrane. By "anisotropic" is meant that the pore size differs from one surface to the other. There are a number of commercially available membranes not encompassed by the term "microporous membrane" or "microfiltration membrane" such as those having one side formed with a very light thin skin layer (skinned, i.e. asymmetric) which is supported by a much more porous open structure which are typically used for reverse osmosis, ultrafiltration and dialysis. Thus, by the term "microporous membrane" or "microfiltration membrane" it is meant membranes suitable for the removal of suspended solids and particulates from fluids and which do not function as ultrafiltration or reverse osmosis membranes but which may have adsorptive and/or sequestration capacity.

By "surface modified microporous membranes" it is meant microporous membranes which provide surface adsorption and/or sequestration effects in addition to the microfiltration effects of the membranes per se. By adsorptive surface, it is meant a surface that has controlled molecular geometry and/or surface functionality that allows species to be attached to the surface by means of ionic, covalent, hydrogen and/or Van Der Walls bonding and/or molecular geometric effects, e.g.

ionic exchange, affinity, frontal, size exclusion and the like.

By the use of the term "hydrophilic" in describing the microporous membrane, it is meant a membrane which adsorbs or absorbs water. Generally, such hydrophilicity is produced by a sufficient amount of hydroxyl (OH—), carboxyl (—COOH), amino (—NH$_2$), and/or similar functional groups on the surface of the membrane. Such groups assist in the adsorption and/or absorption of the water onto the membrane. Such hydrophilicity of the membrane and internal microstructure of the surface modified membrane of this invention is preferred in order to render the membrane more useful for the treatment of aqueous fluids.

Preferred microporous membranes are produced from nylon. The term "nylon" is intended to embrace film forming polyamide resins including copolymers and terpolymers which include the recurring amido grouping.

While, generally, the various nylon or polyamide resins are all copolymers of a diamine and a dicarboxylic acid, or homopolymers of a lactam of an amino acid, they vary widely in crystallinity or solid structure, melting point, and other physical properties. Preferred nylons for use in this invention are copolymers of hexamethylene diamine and adipic acid (nylon 66), copolymers of hexamethylene diamine and sebacic acid (nylon 610) and homopolymers of poly-o-caprolactam (nylon 6).

Alternatively, these preferred polyamide resins have a ratio of methylene (CH$_2$) to amide (NHCO) groups within the range about 5:1 to about 8:1, most preferably about 5:1 to about 7:1. Nylon 6 and nylon 66 each have a ratio of 6:1, whereas nylon 610 has a ratio of 8:1.

The nylon polymers are available in a wide variety of grades, which vary appreciably with respect to molecular weight, within the range from about 15,000 to about 42,000 and in other characteristics.

The highly preferred species of the units composing the polymer chain is polyhexamethylene adipamide, i.e. nylon 66, and molecular weights in the range above about 30,000 are preferred.

To the extent that commercially available polymers contain additives such as antioxidants and the like, such additives are included within the term "polymer" as used herein.

The membrane substrates can be produced by modifying the method disclosed in U.S. Pat. No. 3,876,738 to Marinaccio et al or described in European patent application No. 0 005 536 to Pall. The entire disclosures of both of these references are incorporated herein by reference.

The Marinaccio et al process for producing membrane develops a unique fine internal microstructure through the quench technique described therein, offering a superior substrate for filtration. Broadly, Marinaccio et al produces microporous films by casting or extruding a solution of a film-forming polymer in a solvent system into a quenching bath comprised of a non-solvent system for the polymer. Although the non-solvent system may comprise only a non-solvent, the solvent system may consist of any combination of materials provided the resultant non-solvent system is capable of setting a film and is not deleterious to the formed film. For example, the non-solvent system may consist of materials such as water/salt, alcohol/salt or other solvent-chemical mixtures. The Marinaccio et al process is especially effective for producing nylon films. More specifically, the general steps of the process involve first forming a solution of the film-forming polymer, casting the solution to form a film and quenching the film in a bath which includes a non-solvent for the polymer.

The nylon solutions which can be used in the Marinaccio et al process include solutions of certain nylons in various solvents, such as lower alkanols, e.g., methanol, ethanol and butanol, including mixtures thereof. It is known that other nylons will dissolve in solutions of acids in which it behaves as a polyelectrolyte and such solutions are useful. Representative acids include, for example, formic acid, citric acid, acetic acid, maleic acid and similar acids which react with nylons through protonation of nitrogen in the amide group characteristic of nylon.

The nylon solutions after formation are diluted with non-solvent for nylon and the non-solvent employed is miscible with the nylon solution. Dilution with non-solvent may, according to Marinaccio et al, be effected up to the point of incipient precipitation of the nylon. The non-solvents are selected on the basis of the nylon solvent utilized. For example, when water-miscible nylon solvents are employed, water can be employed. Generally, the non-solvent can be methyl formate, aqueous lower alcohols, such as methanol and ethanol, polyols such as glycerol, glycols, polyglycols and ethers and esters thereof, water and mixtures of such compounds. Moreover, salts can also be used to control solution properties.

The quenching bath may or may not be comprised of the same non-solvent selected for preparation of the nylon solution and may also contain small amounts of the solvent employed in the nylon solution. However, the ratio of solvent to non-solvent is lower in the quenching bath than in the polymer solution in order that the desired result be obtained. The quenching bath may also include other non-solvents, e.g. water.

The formation of the polymer film can be accomplished by any of the recognized methods familiar to the art. The preferred method is casting using a knife edge which controls the thickness of the cast film. The thickness of the film will be dictated by the intended use of the microporous product. In general, the films will be cast at thicknesses in the range of from about 1 mil to about 20 mils, preferably from about 1 to about 10 mils.

Preferably, the polymer solution is cast and simultaneously quenched, although it may be desirable to pass the cast film through a short air evaporation zone prior to the quench bath. This latter technique is, however, not preferred.

After the polymer solution is cast and quenched, it is removed from the quench bath and preferably washed free of solvent and/or non-solvent. Subsequently the film can be at least partially dried.

Pall's aforementioned European patent application No. 0 005 536 describes another similar method for the conversion of polymer into microporous membrane which may be used. Broadly, Pall provides a process for preparing skinless hydrophilic alcohol-insoluble polyamide membranes by preparing a solution of an alcohol-insoluble polyamide resin in a polyamide solvent. Nucleation of the solution is induced by the controlled addition to the solution of a non-solvent for the polyamide resin, under controlled conditions of concentration, temperature, addition rate, and degree of agitation to obtain a visible precipitate of polyamide resin particles (which may or may not partially or completely redissolve) thereby forming a casting solution.

The casting solution is then spread on a substrate to form a thin film. The film is then contacted and diluted with a mixture of solvent and nonsolvent liquids containing a substantial proportion of the solvent liquid, but less than the proportion in the casting solution, thereby precipitating polyamide resin from the casting solution in the form of a thin skinless hydrophilic membrane. The resulting membrane is then washed and dried.

In Pall's preferred embodiment of the process, the solvent for the polyamide resin solution is formic acid and the nonsolvent is water. The polyamide resin solution film is contacted with the nonsolvent by immersing the film, carried on the substrate, in a bath of nonsolvent comprising water containing a substantial proportion of formic acid.

The nylon membrane described in Marinaccio et al and Pall are characterized by hydrophilic isotropic structure, having a high effective surface area and a fine internal microstructure of controlled pore dimensions with narrow pore size distribution and adequate pore volume. For example, a representative 0.22 micrometer rated nylon 66 membrane (polyhexamethylene adipamide) exhibits an initial bubble point (IBP) of about 45 to 50 psid, a foam all over point (FAOP) of about 50 to 55 psid, provides a flow of from 70 to 80 ml/min of water at 5 psid (47 mm. diameter discs), has a surface area (BET, nitrogen adsorption) of about 13 $m^2/g$ and a thickness of about 4.5 to 4.75 mils.

As will be apparent from the foregoing description, both the Marinaccio and Pall processes involve the formation of a nylon polymer solution or dope which is then diluted with a non-solvent, cast on a suitable substrate surface and contacted with additional non-solvent to cause precipitation of the polyamide resin from the dope solution in the form of a thin skinless hydrophilic membrane. In the aforementioned pending Ostreicher et al, Barnes et al and Chu et al applications, the resulting membrane is charge modified by contacting the formed membrane with a charge modifying amount of a charge modifying agent. In the present invention, the surface modifying agent (which can be a cationic or anionic charge modifying agent) is incorporated into the polymer solution or dope before the membrane is precipitated. The membrane can thereafter be formed by the casting technique described in Marinaccio et al and Pall or alternatively, the dope can be introduced into the quenching bath of the non-solvent under shear to produce fibers of the surface modified membrane which can be formed into a sheet material similarly to the formation of paper from fibers, e.g. as described in U.S. Pat. No. 4,309,247 to Hou et al (1982) or made into hollow fibers to produce surface modified hollow fibers similar to those produced in copending U.S. application Ser. No. 566,762 to Marinaccio, filed Dec. 29, 1983.

The surface modifying agent is bound to the internal microstructure, preferably substantially all of the internal microstructure, of the microporous membrane. By the use of the term "bound" it is meant that the surface modifying agent is sufficiently attached to or incorporated into the membrane so that it will not significantly extract under the intended conditions of use. By the use of the term "substantially all of the internal microstructure" as used herein, it is meant substantially all of the external surface and internal pore surfaces. Typically by this is meant the surfaces which are wetted by a fluid, e.g., water, passing through the membrane or in which the membrane is immersed.

The term "surface modifying agent" means a compound, material or composition which when bound to the membrane, alters its capacity to remove a desired entity from a fluid being filtered and which is compatible with the dope. By the use of the term "charge modifying agent", it is meant a compound or composition that when bound to the microporous filter membrane alters the "zeta potential" of the membrane (see Knight et al, "Measuring the Electrokinetic Properties of Charged Filter Media," Filtration and Separation, pp. 30–34, Jan./Feb. 1981).

The cationic charge modifier is a compound or composition which is capable of being bound to the membrane microstructure and provides a more positive zeta potential to the membrane microstructure. Preferably, such cationic charge modifier is a water-soluble compound having substituents capable of binding to the membrane and substituents which are capable of producing a more positive "zeta potential" in the use environment (e.g. aqueous) or cationic functional groups. Most preferably, the agent may be a water-soluble organic polymer capable of becoming a non-extractable contituent of the membrane.

The cationic charge modifying agent can also be cross-linked to itself or to the membrane polymer through a cross-linking agent, for example, an aliphatic polyepoxide having a molecular weight of less than about 500.

The cationic charge modifying agent may have either a high or low charge density, or anything between these extremes, however, high charge density is preferred.

The preferred cationic charge modifier is selected from the class of polyamido-polyamine epichlorohydrin cationic resins, in particular, those described in the following U.S. Pat. Nos.:

2,926,116 to Keim;
2,926,154 to Keim;
3,224,986 to Butler et al;
3,311,594 to Earle, Jr.;
3,332,901 to Keim;
3,382,096 to Boardman; and
3,761,350 to Munjat et al.

The entire disclosures of all of these references are incorporated herein by reference.

Broadly, these preferred charge modifiers (hereinafter "polyamido-polyamine epichlorohydrin") are produced by reacting a long chain polyamide with epichlorohydrin, i.e. 1-chloro-2,3 epoxypropane having the formula:

The polyamide may be derived from the reaction of a polyalkylene polyamine and a saturated aliphatic dibasic carboxylic acid containing from about 3 to 10 carbon atoms. The polyamide produced is water-soluble and contains the recurring groups:

where n and x are each 2 or more and R is the divalent hydrocarbon radical of the dicarboxylic acid. This polyamide is then reacted with epichlorohydrin to form the preferred water-soluble charge modifiers used in its invention.

The dicarboxylic acids which may be used in preparing the polyamides are the saturated aliphatic dicarboxylic acids containing from 3 to 10 carbon atoms each as malonic, succinic, glutaric, adipic, azelaic and the like. Blends of two or more of the saturated carboxylic acids may also be used.

A variety of polyalkylene polyamines including polyethylene polyamines, polypropylene polyamines, polybutylene polyamides and so on may be employed. More specifically, the polyalkylene polyamines are polyamines containing two primary amine groups and at least one secondary amine group in which the nitrogen atoms are linked together by groups of the formula $-C_nH_{2n}-$, where n is a small integer greater than unity and the number of such groups in the molecule ranges from two up to about eight. The nitrogen atoms may be attached to adjacent carbon atoms in the group $-C_nH_{2n}-$ or to carbon atoms further apart, but not to the same carbon atom. Polyamines such as diethylenetriamine, triethylenetetramine, tetraethylene-pentamine, dipropylenetriamine, and the like, and mixtures thereof may be used. Generally, these polyalkylene polyamines have the general formula:

$$H_2[(C_nH_{2n})NH]_yC_nH_{2n}NH_2$$

wherein n is an integer of at least 2 and y is an integer of 1 to 7.

In carrying out the reaction of the polyalkylene polyamine with the acid, it is preferred to use an amount of dicarboxylic acid sufficient to react substantially completely with the primary amine groups of the polyalkylene polyamine but insufficient to react with the secondary amine groups to any substantial extent. The polyamide produced is then reacted with the epichlorohydrin to form the preferred polyamido-polyamine epichlorohydrin charge modifying agent. Typically, in the polyamide-epichlorohydrin reaction it is preferred to use sufficient epichlorohydrin to convert all of the secondary amine groups to tertiary amine groups, and/or quaternary ammonium groups (including cyclic structures). Generally, however, from about 0.5 mol to about 1.8 moles of epichlorohydrin for each secondary amine group of the polyamide may be used.

The epichlorohydrin may also be reacted with a polyaminoureylene containing tertiary amine nitrogens to produce the primary charge modifying agents which may be utilized in this invention (see for example the aforementioned Earle, Jr.).

Other suitable charge modifying agents of the foregoing type may be produced by reacting a heterocyclic dicarboxylic acid with a diamine or polyalkylene polyamine and reacting the resultant product with epichlorohydrin (see for example the aforementioned Munjat et al.)

The polyamido-polyamine epichlorohydrin cationic resins are available commercially as Polycup 172, 1884, 2002 or S2064 (Hercules); Cascamide Resin pR-420 (Borden); or Nopcobond 35 (Nopco). Most preferably, the polyamido-polyamine epichlorhydrin resin is Polycup 1884 or Hercules R4308, wherein the charged nitrogen atom forms part of a heterocyclic grouping and is bonded through methylene to a depending, reactive epoxide group.

Each monomer group in R 4308 has the general formula:

Polycup 172, 2002 and 1884, on the other hand, have monomer groups of the general formula:

wherein R is methyl or hydrogen (Polycup 172 and 2002, R=H; and Polycup 1884, R=CH_3).

A secondary charge modifying agent may be used to enhance the cationic charge of the primary charge modifying agent and/or enhance the bonding of the primary charge modifying agent. The secondary charge modifying agent may be selected from the group consisting of:

(i) aliphatic amines having at least one primary amino or at least two secondary amino groups; and (ii) aliphatic amines having at least one secondary amine and a carboxyl or hydroxyl substituent.

Preferably, the secondary charge modifying agent is a polyamide having the formula:

$$H_2N-(R_1-N)_xR_2-NH_2$$
$$\phantom{H_2N-(R_1-}H\phantom{N)_xR_2-NH_2}$$

wherein $R_1$ and $R_2$ are alkyl of 1 to 4 carbon atoms and x is an integer from 0 to 4. Preferably, $R_1$ and $R_2$ are both ethyl.

Preferred polyamines are:

| | |
|---|---|
| Ethylene diamine | $H_2N-(CH_2)_2-NH_2-NH_2$ |
| Diethylenetri-amine | $H_2N-(CH_2)_2-NH-(CH_2)_2-NH_2$ |
| Triethylenetetramine | $H_2N-(CH_2-CH_2-NH)_2-CH_2-CH_2-NH_2$ |
| Tetraethylenepentamine | $H_2N-(CH_2-CH_2-NH)_3-CH_2-CH_2-NH_2$ |

The highly preferred polyamine is tetraethylene pentamine.

Alternatively, aliphatic amines used in this invention may have at least one secondary amine and a carboxyl or hydroxyl substituent. Exemplary of such aliphatic amines are gamma-amino-butyric acid ($H_2NCH_2CH_2CH_2COOH$) and 2-amino-ethanol ($H_2NCH_2CH_2OH$).

The secondary charge modifying agent is bonded to the microporous membrane by bonding to a portion of the epoxide substituents of the polymeric primary charge modifying agent.

The amount of primary and secondary cationic charge modifying agent utilized is an amount sufficient to enhance the electropositive capture potential of the microporous membrane. Such an amount is highly dependent on the specific charge modifying gents utilized. For general guidance, however, it has been found that a weight ratio of primary to secondary charge modifying agent of from about 2:1 to about 500:1, preferably from about 25:1 to about 75:1 is generally sufficient.

In another embodiment of the present invention, the foregoing "secondary" charge modifying agent can be used as the charge modifying agent by the cojoint employment of an aliphatic polyepoxide crosslinking agent having a molecular weight of less than about 500. Preferably, the polyepoxide is a di- or tri- epoxide having a molecular weight of from about 146 to about 300. Such polyepoxides have viscosities (undiluted) of less than about 200 centipoises at 25° C. Due to the necessity of the epoxide to act as a crosslinking agent, monoepoxides, e.g. glycidyl ethers, are unsuitable. Similarly, it is theorized that a polyepoxide offering greater than three epoxy groups offers no benefit and in fact may limit the coupling reactions of the polyepoxide by steric hindrance. Additionally, the presence of unreacted epoxide groups in the cationically charge modified microporous membrane may be undesirable in the finished product.

Highly preferred polyepoxides have the formula:

wherein R is an alkyl of 1 to 6 carbon atoms and n is from 2 to 3. The limitation that the number of carbon atoms in the non-epoxide portion —(R)— be less than 6 is so that the polyepoxide will be soluble in water or ethanol-water mixtures, e.g. up to 20% ethanol. While higher carbon content materials are functionally suitable, their application would involve the use of polar organic solvents with resulting problems in toxicity, flammability and vapor emissions.

The anionic charge modifying agent is a compound or composition which is capable of bonding to the membrane microstructure without substantial pore size reduction or pore blockage and provides an anionic charge or negative zeta potential to the membrane microstructure. Preferably, such anionic charge modifier is a water-soluble compound having substituents capable of binding to the membrane and substituents which are capable of producing a more negative "zeta potential" in the use environment (e.g. aqueous) or anionic functional groups.

Preferred anionic functional groups may be carboxyl, phosphonous, phosphonic and sulfonic. Preferably, the anionic charge modifying agent may be a water-soluble organic polymer or polyelectrolyte having a molecular weight greater than about 2,000 and less than about 500,000 and capable of becoming a non-extractable constituent of the membrane.

The anionic charge modifying agent may have either a high or low charge density, or anything between these extremes, however high charge density is preferred. Specific preferred anionic charge modifying agents useful herein are poly (styrene sulfonic) acid, poly (toluene sulfonic) acid, poly (vinyl sulfonic) acid and poly (acrylic) acid. Other anionic charge modifying agents are poly (methacrylic acid), poly (itaconic acid), hydrolyzed poly (styrene/maleic anhydride) and poly (vinyl phosphonic acid). Additionally, the alkali and alkaline earth metal salts of all of the foregoing may be utilized.

Highly preferred anionic charge modifying agents are poly (styrene sulfonic) acids having a molecular weight between 2,000 and 300,000, and poly (acrylic acid) having a molecular weight between 2,000 and 300,000.

The anionic charge modifying agent may also be crosslinked to the microporous membrane structure or itself in the same manner as the cationic agents using the same aliphatic polyepoxide cross-linking agent having a molecular weight of less than about 500. In addition to the preferred polyepoxides described above, certain diglycidyl ethers of aliphatic diols, may be used. Examples are 1,2-ethanediol, 1,3-propanediol, and 1,4-butanediol. The preferred diglycidyl ether of 1,4-butanediol is commercially available from Ciba-Geigy, Inc. as RD-2 and from Celanese Corp. as Epi-Rez 5022 and Polyscience.

Other higher carbon diglycidyl ethers may be used as the polyepoxide cross-linking agent, for example 5-pentauediol diglycidyl ether. However, the appropriate polar organic solvents must be used for diluting such polyepoxides.

Triglycidyl ethers, i.e. tri-epoxides may also be utilized as the polyepoxide cross-linking agent. The triepoxides have the following formula:

The triglycidyl ether of glycerol is available from Shell, Inc. as Epon 812 and Celanese Corp. as Epi-Rez 5048.

Another preferred cross-linking agent is methylated urea formaldehyde resin, commercially available from American Cyanamid; for example, Beetle 65, and melamine formaldehyde, e.g., Cymel 303 from American Cyanamid.

Other water-soluble polymers having polar groups can also be employed in this invention as the charge modifying agent. Examples include sodium alginate, ethylene diamine tetraacetic acid, diethylene triamine tetraacetic acid, tetraethylene pentamine tetraacetic acid, quaternized polyethyleneimine, quaternized vinyl pyridine, quaternized diethylaminoethylmethacrylate and the like. The molecular weight of the charge modifying agent does not appear to be significant so long as the agent is soluble in the polymer "dope". Thus, sodium alginate which has a molecular weight above 10,000 and ethylene diamine tetra acetic acid which has a molecular weight below 10,000 are equally employable. The polyamido-polyamine epichlorohydrin cationic resins generally have a molecular weight above 10,000. For example, Polycup 1884 has a molecular weight of about 300,000 and R4308 has a molecular weight of about 530,000.

Other surface modifying agents which are soluble or suspendable in aqueous solvents include such materials as carbon, diatomaceous earth, barium ferrite, iodine, aluminum, alumina, silica, kaolin, molecular sieves, carbohydrates, perlite, clays, vermiculite, and the like.

Broadly, the process of this invention is directed to surface modifying a hydrophilic organic polymeric microporous membrane, e.g. nylon. The process comprises forming a dope solution of nylon polymer, water-soluble or water-suspendable membrane surface modifying agent and a solvent, diluting the resulting dope solution with a miscible non-solvent for the nylon polymer and contacting the diluted dope solution with sufficient non-solvent for the nylon polymer to precipitate said membrane therefrom. The dilution of the dope solution is preferably carried out up to the point of incipient precipitation of the nylon but should any precipitation occur, the solids can be eliminated by filtration or can be redissolved by adding additional solvent to the diluted dope solution. When cast films are prepared, the diluted dope solution is spread on a substrate surface prior to contact with the non-solvent for precipitation. When fibers are being prepared, the contacting step is conducted by extruding the dope into a quenching bath and/or with the application of shear.

In order to provide the surface modifying amount of surface modifying agent to the membrane, it is preferred that the polymer dope solution contain at least about 0.01% surface modifying agent, by weight of total solids. The maximum amount of surface modifying agent in the solution is limited by economic and solubility-suspendability limitations. For example, an excess of modifying agent which does not become bonded to the microporous membrane will not be economically utilized and will constitute an undesirable extractive from the membrane. It has been found that the amount of surface modifying agent in the dope should probably not exceed about 75% by weight of total solids.

After the microporous membrane has been prepared, it is then dried and cured, preferably in a restrained condition to prevent shrinkage.

Drying of the membrane under restraint is described in the Assignee's defensive publication T 103,602 to Repetti, published Nov. 1, 1983. The entire disclosure of this publication is incorporated herein by reference. Generally, any suitable restraining technique may be used while drying, such as winding the membrane tightly about a drying surface, e.g. a drum. Biaxial control is preferred and tensioning the membrane on a stretching frame is considered the most preferred. Preferably, the restraining imposed effects no reduction in dimensions.

Final drying and curing temperatures should be to dry and cure the treated membranes, preferably from about 120° C. to 140° C. for minimization of drying times without embrittlement or other detrimental effects to the membrane.

The completed membrane may be rolled and stored for use under ambient conditions. It will be understood that the treated membrane may be supplied in any of the usual commercial forms, for example, as discs or pleated cartridges.

The present invention provides an integral, coherent microporous membrane of retained internal pore geometry. The surface modified membrane has an improved effective filtration rating relative to the untreated micro-reticulate polymer structure.

For so-called sterile filtrations involving biological liquids, the filter is sanitized or sterilized by autoclaving or hot water flushing. Accordingly, the surface modified membrane must be resistant to this type treatment, and must retain its integrity in use. Any modification to the filter structure, especially brought about by chemical agents which may be unstable under conditions of treatment and use, must be scrutinized with care to minimize the prospect of extractables contaminating the filtrate, interfering with analyses and potentially introducing harmful toxins to a patient. Specifically, any such filter must meet the test standards in the industry, e.g. ASTM D 3861–79 (incorporated herein by reference), and generally prove less than 5 mg. of extractables in 250 ml solvent (water at 80° C.; 35% ethanol at room temperature) for a 293 mm diameter disc.

Biological liquids as that term is employed in the specification and claims, is a liquid system which is derived from or amenable to use with living organisms. Such liquids are ordinarily handled and processed under sanitary or sterile conditions and therefore require sanitized or sterilized media for filtration. Included within such term are isotonic solutions for intermuscular (im) or intravenous (iv) administration, solutions designed for administration per os, as well as solutions for topical use, biological wastes or other biological fluids which may comprise filterable bodies such as impurities, e.g., bacteria, viruses or pyrogens which are desirably isolated or separated for examination or disposal by immobilization or fixation upon or entrapment within filter media.

Filter membranes in accordance with this invention may be employed alone or in combination with other filter media to treat pharmaceuticals such as antibiotics, saline solutions, dextrose solutions, vaccines, blood plasma, serums, (e.g. to remove hormones or toxins), sterile water or eye washes; beverages, such as cordials, gin, vodka, beer, scotch, whiskey, sweet and dry wines, champagne or brandy; cosmetics such as mouthwash, perfume, shampoo, hair tonic, face cream or shaving lotion; food products such as vinegar, vegetable oils; chemical such as antiseptics, insecticides, photographic solutions, electroplating solutions, cleaning compounds, solvent purification and lubrication oils, cutting oils for removal of metallic fines (e.g. where the ferrite modifying agent has been magnetized); and the like for retention of submicronic particles, removal of bacterial contaminants and resolution of colloidal hazes. Illustratively, in hospital usage, membrane filters are employed to concentrate abnormal exfoliated cells from a vaginal rinse, to isolate blood parasites from peripheral blood, or bacteria from serum or leucocytes and casts from urine.

In the case of preparation for use in sterile filtration, the membrane is thermally sterilized or sanitized as by treatment in an autoclave at 121° C. under 15 psig. for 1 hour, or hot water flushing at 85° F. for 1 hour.

The membranes and fibers, etc. of this invention can also be used to provide a bactericide (e.g. where the modifying agent is iodine) or bacteriostatic treatment to fluids, to remove contaminants such as chlorine or phenol from fluids, in molecular separation columns, in bioreactors where cells, etc. are immobilized thereon, as cigarette filters, and for many other uses.

Having now generally described this invention, the same will become better understood by reference to certain specific examples, which are included herein for the purposes of illustration only and are not intended to be limiting of the invention.

EXAMPLES

The following are the measurement and test procedures utilized in all the Examples.

THICKNESS

The dry membrane thickness was measured with a ½ inch (1.27 cm) diameter platen dial indicator thickness gauge. Gauge accuracy was +0.00005 inches (+0.05 mils).

INITIAL BUBBLE POINT (IBP) AND FOAM-ALL-OVER-POINT (FAOP) TESTS

A 47 mm diameter disc of the membrane sample is placed in a special test holder which seals the edge of the disc. Above the membrane and directly in contact with its upper face, is a perforated stainless steel support screen which prevents the membrane from deforming or rupturing when air pressure is applied to its bottom face. Above the membrane and support screen, the holder provides an inch deep cavity into which distilled water is introduced. A regulated air pressure is increased until a first stream of air bubbles is emitted by the water wetted membrane into quiescent pool of water. The air pressure at which this first stream of air bubbles is emitted is called the Initial bubble Point (IBP) of the largest pore in that membrane sample—see ASTM D-2499-66T.

Once the Initial Bubble Point pressure has been determined and recorded, the air pressure is further increased until the air flow through the wetted membrane sample, as measured by a flow meter in the line between the regulator and the sample holder, reaches 100 cc/min. The air pressure at this flow rate is called the Foam-All-Over-Point (FAOP), and is directly proportional to the mean pore diameter of the sample membrane. In this series of tests, these two parameters (IBP and FAOP) are used to determine if any change has occurred in the maximum or mean pore size of the membrane sample as a result of the charge modifying process utilized.

FLOW RATE TEST

A 47 mm diameter disc of the membrane sample is placed in a test housing which allows pressurized water to flow through the membrane. Prefiltered water is passed through the membrane sample at a pressure differential of 5 psid. A graduate cylinder is used to measure the volume of water passed by the membrane sample in a one minute period. In this series of tests this parameter is used in conjunction with the IBP and FAOP to determine if any reduction in pore size or pore blockage has occurred as a result of the charge modifying process utilized.

DYE ADSORPTION TEST

A 47 mm diameter disc of the membrane sample is placed in a test housing which allows pressurized water flow through the membrane. The challenge solution consists of distilled water at a pH of 7.0, and Metanil Yellow dye for cationically charged membranes and methylene blue for anionically charged membranes. The dye inlet concentration is adjusted to produce a 76 percent transmittance at a wavelength of 430 nm, as measured on a Perkin-Elmer Model 295 Spectrophotometer for cationic membranes or 34 percent at 660 nm as measured on a Bausch & Lomb Spectronic 710 Spectrophotometer for anionic membranes. By means of a peristaltic pump the challenge solution is flowed through the membrane sample at a flow rate of 28 ml/min. The transmittance of the effluent is measured by passing it through a constant flow cell in the aforementioned spectrophotometer. The effluent transmittance and pressure drop across the membrane is measured and recorded as a function of time. The test is terminated when the effluent transmittance increases to 85 percent for cationic membranes or 45 percent for anionic membranes of the inlet transmittance. In this series of tests, the length of time that it takes to reach the 85 or 45 percent transmittance in the effluent is called the "breakthrough" time. Since the Metanil Yellow and methylene blue are low molecular weight charged dyes incapable of being mechanically removed (filtered) by the membrane, this breakthrough time is proportional to the charge adsorptive capacity of the membrane sample. This test is therefore used to determined the effectiveness of the charge modification technique.

EXTRACTABLES (ASTM D-3861-79)

Extractables were determined by ASTM D-3861-79. The quantity of water-soluble extractables present in the membrane filters was determined by immersing the preweighed membrane in boiling reagent grade water for an extended time and then drying and reweighing the membrane. A control membrane was employed to eliminate weighing errors caused by balance changes or changing moisture content of the membrane in the weighing procedures. Weight changes of the control membrane were applied as a correction factor to the weight change of the test membrane filters.

EXAMPLE I

A. Preparation of Microporous Membrane

A representative nylon 66 membrane of 0.22 micrometer nominal rating, having a nominal surface area of about 13 m$^2$/g, an Initial Bubble Point of about 47 psi, a Foam-All-Over-Point of about 52 psi was prepared by the method of Marinaccio et al, U.S. Pat. No. 3,876,738, utilizing a dope composition of 16 percent by weight nylon 66 (Monsanto Vydyne 66B), 7.1% methanol and 76.9% formic acid, a quench bath composition of 25% methanol, 75% water by volume (regenerated as required by the method of Knight et al, U.S. Pat. No. 3,928,517) a casting speed of 24 inches/minute (61 cm/min), and a quench bath temperature of 20° C. The membrane was cast just under the surface of the quench bath by application to a casting drum rotating in the bath (9 to 10 mils as cast wet, to obtain 4.5 to 5.5 mils dry) and allowed to separate from the drum about 90° of arc from the point of application, the self-supporting membrane forming a shallow catenary to takeup. A portion of the uniform opaque film was dried (in restrained condition to resist shrinkage) in a forced air oven at 89°-90° C. for 30 minutes.

B. Preparation of Charge Modified Microporous Membrane - Post-Treatment

1. Membrane samples (dried and undried) were dipped in a bath of Hercules 1884 polyamido-polyamine epichlorohydrin resin (4% solids by weight), and allowed to attain adsorption equilibrium. The treated membrane samples were washed to remove excess resin and dried in restrained condition on a drum at a temperature of 110° C. for a period of about 3 minutes.

The treated membrane samples were compared for flow and bubble point characteristics as follows, and found to be essentially identical for treated and untreated samples, evidencing retention of pore and surface geometry. The results are set forth in Table I.

TABLE I

|  | Control (No Treatment) | Undried Membrane | Dried Membrane |
|---|---|---|---|
| Thickness (mils) | 4.25 | 4.58 | 4.83 |
| Initial Bubble Point (psi) | 43.7 | 44.7 | 44.7 |
| Foam-All-Over-Point (psi) | 55.0 | 54.0 | 54.7 |
| Thickness Normalized Flow Rate (cc. mil/min. cm$^2$ · psi) | 7.1 | 7.2 | 7.0 |
| BET, N$_2$ adsorption | 13.12 | — | 13.58 |

Thus, in terms of the morphological and hydrodynamic parameters that control mechanical sieving, the filtration characteristics of the treated membrances were essentially identical with the untreated nylon membrane.

2. Similar characterizations were conducted on another membrane sample, similarly prepared, but treated with 2% Hercules R4308 resin (a free radical polymerized resin based upon diallyl nitrogen-containing materials, reacted with epichlorohydrin) in a bath adjusted to pH 10.5, overcoated with 0.1% tetraethylene pentamine, dried, cured, washed and redried. The results are set forth in Table II.

TABLE II

|  | Control (No Treatment) | Dried Membrane |
|---|---|---|
| Tensile Strength (psi) | | |
| Wet | 528 | 635 |
| Dry | 860 | 960 |
| Elongation (%) | | |
| Wet | 140 | 100 |
| Dry | 95 | 40 |

Surface area of the treated and untreated membranes remained essentially unchanged; tensile strength increased with treatment with some loss in elongation. The treated sheet was more flexible; creasing of the untreated sheet resulted in cracking and splitting.

C. Filtration Tests

The Hercules 1884 treated membrane samples (Example I.B.1.) were subjected to the filtraton tests indicated below:

PYROGEN REMOVAL

Purified *E. coli* endotoxin was added to a 0.9% NaCl solution, pH 6.7 and passed through test filters mounted in a 25 mm diameter stainless steel holder. Inlet and effluent endotoxin levels were determined by standard L.A.L. analysis.

Results are set forth in Table III.

TABLE III

| Filter | Inlet Endotoxin Level (pg/ml) | Effluent Endotoxin Level (pg/ml) | | |
|---|---|---|---|---|
| | | 10 ml | 50 ml | 100 ml |
| Dried, treated Membrane | 15000 | 1000 | 1000 | 1000 |
| Control - | 15000 | 10000 | 10000 | 10000 |

TABLE III-continued

| Filter | Inlet Endotoxin Level (pg/ml) | Effluent Endotoxin Level (pg/ml) | | |
|---|---|---|---|---|
| | | 10 ml | 50 ml | 100 ml |
| Untreated | | | | |

(Pg is "picogram")

VIRUS REMOVAL

MS-2 bacteriophage was added to Houston, Tex. (U.S.A.) tap water to produce a concentration of $3.4 \times 10^5$ PFU/ml (PFU is "Plaque Forming Unit"), and 10 ml was passed through each of the test filters mounted in a 25 mm diameter stainless steel holder. Effluents were analyzed for viral content by standard techniques. Results are set forth in Table IV:

TABLE IV

| Filter | Total Viral PFU in Filtrate | Virus Removal Efficiency (%) |
|---|---|---|
| Dried, treated Membrane | 100 | 99.997 |
| Control - untreated | 250000 | 26.4 |

MONODISPERSE LATEX FILTRATION

The test filters were challenged with a 10 NTU dispersion (NTU is "nephlometric turbidity units") of 0.109 micrometer monodisperse latex (MDL) particles at a flow rate of 0.5 gpm/ft.$^2$ (0.002 lpm/cm$^2$), pH 7.0, R=21,000-ohm-cm. Effluent turbidities (NTU) were monitored and filtration efficiencies were calculated from equilibrium effluent turbidities. Results are set forth in Table V.

TABLE V

| Filter | MDL Removal Efficiency |
|---|---|
| Undried, treated | 97.3% |
| Control-untreated | 10% |

DYE REMOVAL EFFICIENCY

The test filters were challenged with a solution of blue food coloring dye (FD & C No. 1). The solution had a light transmittance of 62.5% at 628 nm. The light transmittance of the effluent was monitored and removal efficiencies determined (based on distilled water light transmittance=100%). Results are set forth in Table VI.

TABLE VI

|  | Throughput (liters) to 90% Transmittance |
|---|---|
| Undried, treated | 1.99 |
| Dried, treated | 1.76 |
| Control-untreated | 0 |

EXAMPLE II

The cationically charged microporous membrane of Example I.B. 1. is prepared by repeating the procedure of Example I.A. and incorporating the Hercules 1884 resin into the dope composition.

EXAMPLE III

A nylon dope solution was prepared containing 10% nylon, 85.3% formic acid and 4.7% methanol. About 28% of Hercules 1884 resin based on the weight of the nylon was introduced into the dope solution. The resulting dope solution was extruded through an orifice which was in near proximity to a recirculating quench bath stream of about 25% v/v aqueous methanol. The recirculating stream produces a moderate shear on the dope solution entering the bath, thereby producing fine fibrils from the dope solution. The resulting fibers were blended at a ratio of 1:1 with coho cellulose fiber and 4.3 grams of the resulting mixture was felted into pads. The electrokinetic status of the pad was determined using streaming potential techniques (Knight and Ostreicher, Measuring the Electrokinetic Properties of Charged Filter Media, Filtration and Separation, Jan.-/Feb., 1981, pp. 30-34). The pad had a slope Mv/Ft $H_2O$ of −6.8, an intercept of −90.70 and an apparent zeta potential of +0.33.

EXAMPLE IV

Approximately 1 liter of a mixture of methanol and formic acid in a weight ratio of 0.04 was prepared and allowed to equilibrate for 1 hour. Then to four separate flasks, 150 ml of the solution was added. Thereafter, Hercules resin 1884 (35% solids) were added in amounts of 1, 5, 10 and 15 milliliters and allowed to equilibrate in a water bath at 40° C. for one hour with agitation.

A sufficient quantity of nylon was added to bring the weight percentage of the nylon to 8% based on the weight of the methanol and acid and the flasks were shaken in a water bath at 40° C. until the nylon dissolved. The compositions of the resulting doped solutions were:

|  | Percentage | | | |
| --- | --- | --- | --- | --- |
| Methanol | 4.1 | 4.1 | 4.0 | 4.0 |
| Formic Acid | 87.8 | 87.2 | 86.4 | 85.7 |
| Nylon | 8 | 7.9 | 7.8 | 7.8 |
| 1884 | 0.2 | 0.9 | 1.8 | 2.5 |

Cationically modified microporous membranes are produced repeating the procedure of Example I. A.

EXAMPLE V

Four dope compositions containing 39 grams of Nylon 66 and the following other ingredients were prepared:

| Dope | Formic Acid Grams | Water Grams | 4308 Resin Grams | Pentamine Grams |
| --- | --- | --- | --- | --- |
| 1 | 231.36 | 29.639 | 0 | 0 |
| 2 | 231.36 | 16.916 | 10.263 | 2.46 |
| 3 | 231.36 | 4.193 | 20.526 | 4.92 |
| 4 | 231.36 | 24.719 | 0 | 4.92 |

Figure 1:
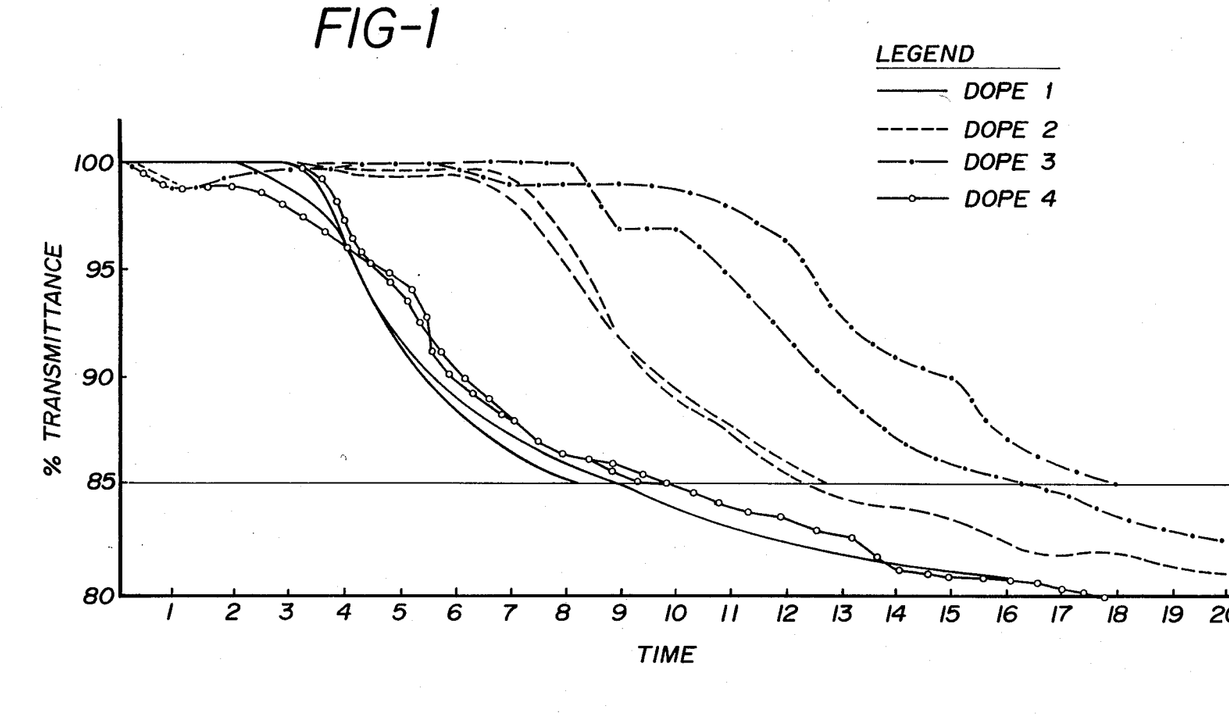
FIG. 1 is a time vs. transmittance graph of membranes described in Example V.

Dope 2 contains one equivalent weight of 4308 Resin and triethylenepentamine per weight nylon, formulation 3 contains two equivalent weights of both resin and pentamine per weight nylon and dope 4 contains two equivalent weights of the pentamine alone. The dopes were placed in a jar mill roller bath at 20° C. until full dissolution. Following the procedure of EXAMPLE I. A., two membranes were cast from each dope just under the surface of a quench bath (30% methanol, 70% water by volume) by application to a casting drum rotating in the bath using an 8 mil blade to drum depth. The membranes made from each dope were separated from the casting drum and rinsed in two successive wash baths of distilled water. The membrane sheets were then doubled over on top of themselves while wet and mounted in restrained condition to resist shrinkage and placed in a forced draft oven at 80° C. for one-half hour. The membranes were then subjected to Metanil Yellow dye absorption tests, the results of which are shown in FIG. 1. Thereafter, the membranes were subjected to flow, IBP and FOAP tests and the following results obtained:

| Dope | Sample | Flow (Ml/Min) | IBP (psi) | FAOP (psi) |
| --- | --- | --- | --- | --- |
| 1 | 1 | 72 | 53.5 | 85 |
|  | 2 | 78 | 45.5 | 82.5 |
| 2 | 1 | 39 | 59 | 53.8 |
|  | 2 | 59.5 | 41.5 | 53 |
| 3 | 1 | 103 | 25 | 30 |
|  | 2 | 138 | 25 | 30 |
| 4 | 1 | 6 | 90+ | 90+ |
|  | 2 | 11 | 85.5 | 90+ |

EXAMPLE VI

To 253.6 grams of a Nylon 66 membrane dope for a membrane of a 0.45 micron nominal rating containing 40.576 grams of Nylon 66, methanol and formic acid (16% solids) was added 1.159 grams of Hercules 1884 resin (35% solids) to give 1% resin based on the nylon and the resulting mixture was agitated until a clear solution was obtained. Membranes were prepared following the procedure of Example I.A., using the dope without the 1884 resin and the dope with the resin. The membranes were dried under restrained conditions for 30 minutes at 85° C. and their properties were measured using test water which had been prefiltered through a 0.2 micrometer nominal rating membrane. The results are shown in the following table:

| Membrane | Thickness | Flow cc/Min.-psi-cm$^2$ | IBP (psi) | FAOP (psi) |
| --- | --- | --- | --- | --- |
| Dope without resin | 4.13 | 2.27 | 41.3 | 47.5 |
| Dope with resin | 4.4 | 2.44 | 38.4 | 45.3 |

The membrane prepared with the dope which did not contain the cationic 1884 resin had an IBP/FAOP ratio of 0.869 while the membrane prepared with the resin had a ratio of 0.848.

EXAMPLE VII

A membrane dope was prepared by combining 1805.5 parts of Nylon 66 with 9479 parts of a mixture of methanol and formic acid to obtain a 16% solids nylon dope. The mixture was heated with agitation at 30° C. for about 4 hours.

A quantity of Polycup 1884 was added to the dope in a quantity such that the concentration of the cationic charge modifying resin was about 1% based on the weight of the nylon. Cast membranes were then prepared using the procedure described in Example I.A. A portion of the resulting wet membrane was dried in restrained condition as a single layer in an oven at 85° C. for 15 minutes. The resulting nominal 0.22 micrometer rated membrane had a thickness of 4.1 mils. Another portion of the wet membrane was folded back onto itself and dried under restrained conditions in the 85° C. oven for 60 minutes. The resulting membrane was 7.8 mils thick. Prior to drying, the wet membrane had a thickness of about 6.1–6.4 mils. The nominal pore size of the membrane was 0.3 micron.

EXAMPLE VIII

Following the procedure of Example III, pads were produced using other surface modifying agents. The agent, blend ratio, number of grams felted and electrokinetic status of the pads are shown in the following table:

| Agent | Fiber to COHO Ratio | Grams Felted | Slope Mv/Ft H$_2$O | Intercept | Apparent Zeta Pot. |
|---|---|---|---|---|---|
| Alon | 0.53 | 1.6 | 32.9 | 0.69 | −1.60 |
| Asbestos[1] | 0.83 | 2.5 | 5.1 | −32.90 | −0.25 |
| Asbestos[2] | 1.00 | 4.4 | 14.2 | 32.30 | −0.69 |
| Asbestos[3] | 1.00 | 3.6 | 25.1 | −35.00 | −1.22 |
| Asbestos[4] | 0.97 | 2.9 | 17.4 | −33.50 | −0.84 |
| Casein | 1.00 | 3.2 | 20.1 | 59.00 | −0.97 |
| Silica | 1.00 | 3.0 | 25.0 | 20.66 | −1.21 |
| Cabosil | 1.00 | 8.0 | 32.2 | −53.50 | −1.56 |
| Sephadex (G-75) | 1.00 | 5.5 | 6.3 | −67.24 | −0.30 |
| Bentonite | 1.00 | 5.4 | 46.3 | 64.30 | −2.25 |
| Diatomaceous Earth D.E. 215 | 1.00 | 5.0 | 27.9 | 26.66 | −1.35 |
| Kaolin | 1.00 | 6.0 | 62.4 | −70.20 | −3.02 |
| Na-Alginate | 1.00 | 5.5 | 18.5 | −15.82 | −0.89 |
| Aluminum | 1.00 | 7.8 | −181.8 | −5.49 | +8.82 |
| Carbon | 1.00 | 4.4 | 57.5 | −10.14 | −2.78 |
| Carbon/1884 Resin | 1.00 | 5.1 | 0.3 | 32.00 | −0.01 |
| DE-215/1884 Resin | 1.00 | 5.6 | 7.6 | −26.30 | −0.37 |
| Aluminum (10%) 1884/5Å Molecular Sieve | 1.00 | 3.6 | −6.2 | −50.99 | +0.30 |
| | 0.67 | 2.0 | −29.2 | −30.70 | +1.42 |
| Barium Ferrite | 1.00 | 8.6 | 53.2 | −89.50 | −2.58 |
| EDTA | 1.00 | 5.5 | 19.6 | −4.34 | −0.95 |
| Iodine (Tincture) | 1.00 | 4.3 | 33.1 | 50.03 | −1.60 |

[1]Arizona - not acid washed
[2]Canadian - not acid washed
[3]Arizona - acid washed
[4]Canadian - acid washed

EXAMPLE IX

Following the procedure of Example III, fibers were prepared from a 60 ml dope solution containing 4.8 g nylon with and without 10 g powdered activated carbon. The fibers were exposed for 16 hours to 150 ml of distilled water which had been chlorinated to 450 ppm chlorine. The chlorine content of the water was then determined to be 360 ppm for the water treated with the non-carbon containing fibers and 0.4 ppm for the water treated with the carbon containing fibers.

EXAMPLE X

Anionically charged microporous membranes are prepared by repeating the procedure of Example I.A. and incorporating the following into the dope composition:
4% polystyrene sulfonic acid and 2.7% ethylene glycol diglycidal ether;
1.3% polyacrylic acid;
0.88% polyacrylic acid and 0.12% polyoxyethylenepolyoxypropylene glycol;
3.6% polyacrylic acid (mw 104,000) and 1.3% hexamethoxy methylmelamine resin.

EXAMPLE XI

Into a polymer dope solution containing about 8% nylon 66, was suspended activated carbon (67w % of total solids). The suspension was allowed to flow by gravity into a 75%/25% by volume water/methanol non-solvent through a small orifice. The resulting fibrils were harvested, washed and then tested for chlorine and phenol removal from water. In both cases, the capacity of the fibrils was about 90–95% of the particulate carbon per se and at equivalent mass transfer rates. The fibrils did not manifest the same degree of problems encountered with finely powdered carbon which has very poor hydrodynamic characteristics, is difficult to retain and tends to migrate.

EXAMPLE XII

Following the procedure of Example I, unmodified and post-formation modified microporous membranes were prepared. The post-formation modified microporous membranes were made by dipping one of the unmodified membranes into a 2 w % solution of Hercules Polycup 172 resin (0.24% solids). The same dope was modified by the addition of 7 w % of the Polycup 172 resin (0.84% solids) and duplicate microporous membranes prepared. When removed from the quench bath, the membranes were air dried and then dried in a forced air oven at 40° C. for 16 hours. The five membranes were analyzed for integrity by determining bubble point, FOAP and then challenged with Metanil Yellow dye. The results are shown in the following table:

| Membrane | Bubble Point | FOAP | PSI Initial | PSI Final | Dye Ret. Time (min.) |
|---|---|---|---|---|---|
| Unmodified | 40 | 46 | 3.0 | 3.6 | 7 |
|  | 38 | 44 | 1.9 | 2.9 | 7 |
| Modified - Post Treatment | 44 | 50 | 3.9 | 5.0 | 24 |
| Modified Dope | 31 | 52 | 3.9 | 12.0 | 77 |
|  | 31 | 53 | 4.3 | 14.0 | 73 |

Various changes and modifications can be made in the process of the present invention without departing from the spirit and scope thereof. The various embodiments which have been described herein were for the purpose of further illustrating the invention but were not intended to limit it.

What is claimed is:

1. A filter media comprising a felted structure of nylon microporous membrane fibers having a microstructure throughout each fiber and cellulose fibers.

2. The filter media of claim 1, further comprising a surface modifying agent modifying the microstructure of the nylon fibers.

3. The filter media of claim 2, wherein the surface-modifying agent is a charge modifying agent.

4. The filter media of claim 3, wherein the charge modifying agent is a water-soluble cationic charge modifying agent.

5. The filter media of claim 4, wherein the cationic charge modifying agent is a polyamine epichlorohydrin cationic resin.

6. The filter media of claim 3, wherein the charge modifying agent is a water-soluble anionic surface modifying agent.

7. The filter media of claim 6, wherein the anionic charge modifying agent is a water-soluble organic polymer having a molecular weight of about 2,000 to 500,000.

8. The filter media of claim 6, wherein the anionic charge modifying agent is poly (styrene sulfonic acid) having a molecular weight between 2,000 and 300,000.

9. The filter media of claim 6, wherein the anionic charge modifying agent is poly (acrylic acid) having a molecular weight between 2,000 and 300,000.

10. The filter media of claim 3 wherein the charge modifying agent is a water insoluble cationic surface modifying agent.

11. The filter media of claim 10, wherein the water insoluble cationic charge modifying agent is aluminum.

12. The filter media of claim 3, wherein the charge modifying agent is a water insoluble anionic surface modifying agent.

13. The filter media of claim 12, wherein the water insoluble anionic charge modifying agent is kaolin.

14. The filter media of claim 2, wherein the surface modifying agent is a water suspendable, water insoluble particulate, surface modifying agent encapsulated by the nylon membrane.

15. The filter media of claim 14, wherein the surface modifying agent is carbon.

16. The filter media of claim 14, wherein the surface modifying agent is selected from the group consisting of asbestos, silica, bentonite, kaolin, aluminum, barium ferrite and an iodine containing composition.

17. The filter media of claim 14, wherein the surface modifying agent is barium ferrite.

18. The filter media of claim 14, wherein the surface modifying agent is an iodine containing composition.

19. The filter media of claim 1, wherein the microporous membrane has a surface modifying agent bonded to substantially all of the microstructures of the fibers.

* * * * *